W. J. PRUCHA & C. W. WEATHERWAX.
MOTION PICTURE APPARATUS.
APPLICATION FILED OCT. 3, 1912.
1,259,775. Patented Mar. 19, 1918.
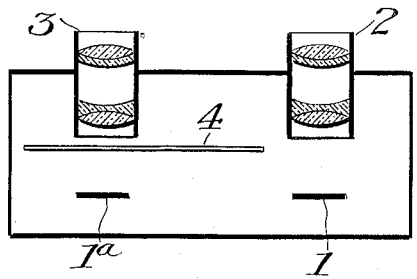
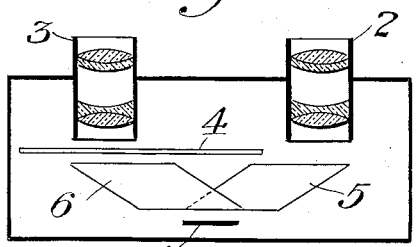
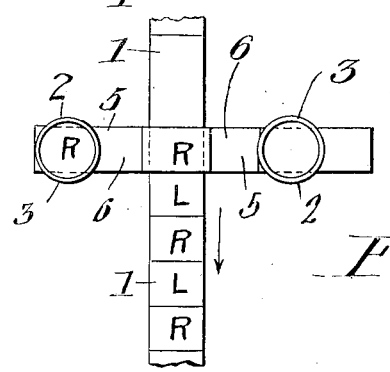
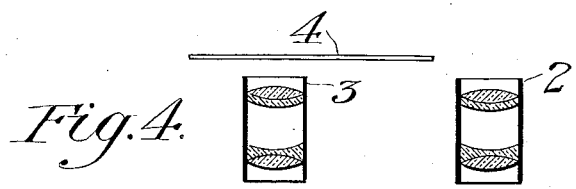
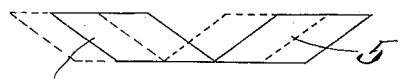

UNITED STATES PATENT OFFICE.

WILLIAM JAMES PRUCHA AND CHARLES WASHINGTON WEATHERWAX, OF HONOLULU, TERRITORY OF HAWAII.

MOTION-PICTURE APPARATUS.

1,259,775.  Specification of Letters Patent.  Patented Mar. 19, 1918.

Application filed October 3, 1912. Serial No. 723,727.

*To all whom it may concern:*

Be it known that we, WILLIAM JAMES PRUCHA and CHARLES WASHINGTON WEATHERWAX, citizens of the United States, residing in the city and county of Honolulu, Territory of Hawaii, have invented certain new and useful Improvements in Motion-Picture Apparatus; and we do hereby declare the following to be a full, clear, and exact description of the invention, such as will enable others skilled in the art to which it appertains to make and use the same.

This invention relates to photographic films for use in moving picture machines, and particularly to improvements in the method of producing the same. The object of the invention is to produce films which will give to the pictures thrown upon the screen the appearance of relief and solidity belonging to ordinary vision, that is stereoscopic pictures.

Our invention contemplates a film having thereon a series of positive pictures made from negatives taken by exposures in rapid succession alternately in two adjacent positions, such as through first one and then through the other of two sets of photographic lenses placed side by side and focused upon the objects.

These positives are preferably made from negatives taken with the apparatus shown in the drawing. Referring to the drawing, the two rhomboidal prisms 5 and 6, between the film 1 and the lenses 2 and 3, are turned in opposite directions and end to end, and are adapted to slide together horizontally in a direction at right angles to the axes of the lenses 2 3. These prisms are shown as moved to the left so as to bring prisms 5 in position to deflect the rays coming through the lenses 2 onto the film 1 when the shutter 4 uncovers said lenses. The exposure having been made, the shutter 4 now covers both lenses 2 and 3, the film is moved another step, and the prisms 5 and 6 are moved to the right hand to a position for deflecting the rays through the lenses 3 onto the film 1, the shutter 4 then uncovers the lenses 3 and this exposure having been made, the shutter 4 again covers both lenses 2 and 3 while the film 1 is moved another step and the prisms 5 and 6 are shifted, whereupon an exposure is again made by the lenses 2 in the manner described, these operations being repeated in rapid succession. The film is then developed and fixed in the usual manner, and used for making the positive films which give a stereoscopic effect to the pictures thrown upon the screen.

Throughout the foregoing description, the expressions right hand and left hand refer to the hand of the operator standing in the rear of the apparatus. It will now be noted that by our improvements in the method of producing photographic films for use in moving picture machines, the pictures when thrown upon the screen are those taken in two adjacent positions alternately and as they follow one another in rapid succession they appear stereoscopic to observers.

We claim:—

1. In a moving picture machine, the combination of two stationary lenses associated with the machine, and two adjacent prisms adapted to move to the right and left alternately and adapted when in one of such positions to deflect the rays passing through one of said lenses on to the film and in the other position to deflect the rays passing through the second lens on to the film.

2. In a moving picture machine, two stationary lenses associated with the machine, and two rhomboidal prisms interposed between said lenses and the film adapted to be moved to the right and left alternately and adapted in one of such positions to deflect the rays passing through one of said lenses on to the film and in the other position to deflect the rays passing through the second lens on to the film.

3. In a moving picture machine, two stationary lenses associated with the machine, and two unitarily movable rhomboidal prisms interposed between said lenses and the film adapted to be moved to the right and left alternately and adapted in one of such positions to deflect the rays passing through one of said lenses on to the film and in the other position to deflect the rays passing through the second lens on to the film.

4. In a moving picture machine, the combination of two stationary lenses associated with the machine, and movable rhomboidal prisms each of which is adapted when properly positioned between one lens and the film to deflect the rays passing through that lens on to the film.

5. In a moving picture machine, the combination of a plurality of stationary lenses associated with the machine, a prism disposed between each lens and the film for deflecting the rays passing through each lens on to said film, the prisms being adapted to be shifted to bring the proper prism into position between the lens and the film at the proper time.

In testimony whereof we affix our signatures, in presence of two witnesses.

WILLIAM JAMES PRUCHA.
CHARLES WASHINGTON WEATHERWAX.

Witnesses:
ROBT. J. PRATT,
DAN G. WEBBER.